United States Patent [19]

Ichinose et al.

[11] Patent Number: 4,768,181
[45] Date of Patent: Aug. 30, 1988

[54] APPARATUS FOR DETERMINING DEFECTIVE OR NON-USED SECTORS OF AN OPTICAL DISH

[75] Inventors: Makoto Ichinose, Sakai; Isao Satoh, Neyagawa; Tatuo Sugimura, Yawata; Yuzuru Kuroki, Moriguchi, all of Japan

[73] Assignee: Matsushita Electric Industrial Co., Ltd., Osaka, Japan

[21] Appl. No.: 673,620

[22] Filed: Nov. 21, 1984

[30] Foreign Application Priority Data

Nov. 25, 1983 [JP] Japan ................................ 58-222405
Mar. 7, 1984 [JP] Japan ................................ 59-43415

[51] Int. Cl.$^4$ ........................ G11B 7/00; G11B 7/013
[52] U.S. Cl. ........................................ 369/54; 369/32; 369/58
[58] Field of Search ................................ 369/44-46, 369/53-58; 360/38.1

[56] References Cited

U.S. PATENT DOCUMENTS

| | | | |
|---|---|---|---|
| 4,145,758 | 3/1979 | Drexler et al. ........................ | 369/44 |
| 4,214,280 | 7/1980 | Halfhill et al. ........................ | 360/53 |
| 4,433,403 | 2/1984 | Baba et al. | |
| 4,545,044 | 10/1985 | Satoh et al. ........................ | 369/58 |
| 4,546,462 | 10/1985 | Koishi et al. ........................ | 369/46 |

FOREIGN PATENT DOCUMENTS 0046323 2/1982 European Pat. Off. .
0072704 2/1983 European Pat. Off. .

OTHER PUBLICATIONS

European Search Report No. 84 11 4179, (Oct. 14, 1987).
R. McFarlane, "Digital Optical Recorders at 5 Mbit/s Data Rate, *Optical Engineering,* Sep./Oct. 1982, vol. 21, No. 5.
Seisakusho K. K. et al., "Optical Recording and Reproducing Disk", vol. 6, No. (P-128)(1007), Jul. 15, 1982.
Sangyo K. K. et al., "Signal Recording and Reproducing System", vol. 6, No. 27 (P-102)(903), Feb. 17, 1982.

*Primary Examiner*—Raymond F. Cardillo
*Assistant Examiner*—James E. Tomassini
*Attorney, Agent, or Firm*—Stevens, Davis, Miller & Mosher

[57] ABSTRACT

An optical information recording and reproducing apparatus for recording and reproducing information on and from an optical recording disk having an optically detectable guide track divided into a plurality of sectors is disclosed. When a sector to or from which a data is to be recorded or reproduced is a defective sector or a non-use sector because of updating, a special pattern signal is recorded on the defective sector or the non-use sector, and if the recorded special pattern signal is detected in the reproduction cycle, that sector is determined as a defective or non-use sector and recording or reproducing on or from that sector is inhibited.

2 Claims, 9 Drawing Sheets

FIG. 13
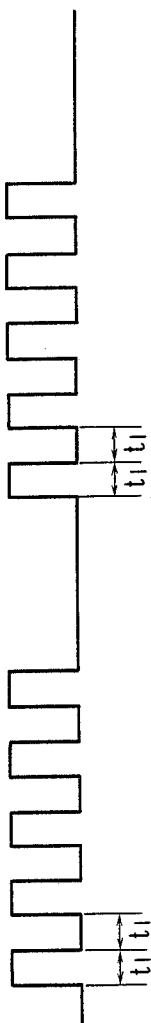
(a) DELETE PULSE
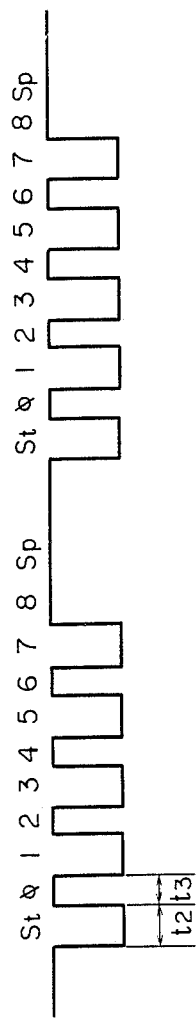
(b) DELETE DETECTION SIGNAL
St ..... START BIT
Sp ..... STOP BIT

APPARATUS FOR DETERMINING DEFECTIVE OR NON-USED SECTORS OF AN OPTICAL DISH

In an optical recording disk memory which is expected to be a high density, high capacity memory, an error control technique for achieving a low error rate of the optical recording disk is very important.

The optical recording disk is usually provided with optically detectable guide tracks such as guide grooves because of its high track density, and data is recorded by irradiating a laser beam having a beam size of approximately 1 μm on recording layers formed on the guide tracks to make holes or change a reflection factor.

Since a recording caused dot size by and a track pitch are in the order of 1 μm, various defects, for example breaks or dust occur in a manufacturing process of the optical recording disk such as in the formation of the guide tracks, manufacture of a replica disk, evaporation of recording material and formation of a protective layer, or in an environment in which the optical recording disk is used, and they cause dropouts of a reproduced signal. The dropouts can occur anywhere and burst dropouts and random dropout occur at the same rate. As a result, a raw error rate of the optical recording disk is $10^{-4}$–$10^{-6}$ which is much higher than an error rate of $10^{-9}$–$10^{-12}$ in a magnetic disk which is a typical conventional recording medium.

For this reason, the optical information recording and reproducing apparatus which uses the optical recording disk usually has a powerful error control mechanism.

FIG. 1 shows a format of a signal actually recorded on the optical recording disk. Numeral 1 denotes a synchronizing signal field for causing clock synchronization pull-in when a data is reproduced, numeral 2 denotes a data mark field having a predetermined code recorded therein to indicate a beginning of a data, and numeral 3 denotes a coded data field having redundancy bits added and interleaved in accordance with an error correction code theory. A record signal block comprising the synchronizing signal field 1, the data mark field 2 and the coded data 3 is recorded in an information recording area B in a sector sectioned by address fields 4 as shown in FIG. 2. In the address field 4, a track address and a sector address are usually recorded.

When digital information having a variable data length is recorded, it is very effective to divide the optical recording disk into sectors and record the data by a predetermined unit because the record areas can be efficiently utilized.

The dropouts in the optical recording disk usually lowers an envelope of a reproduced signal and cause demodulation errors. If the dropouts exceed an ability of the error correction code, the demodulation errors cannot be fully corrected.

In a non-rewritable disk, if a data recorded in a sector is read out and a demodulation error is incorrectable, the data in that sector is rendered non-reproducible and the data is again recorded in another sector.

When a portion of the data is updated or a file is erased, the obsolete data should be rendered non-reproducible.

When it is expected that, because of dropouts, a data will not be correctly reproduced even if the data is recorded in an information recording area of a non-recorded sector, it is desirable to regard that sector as a defective sector and not to record the data in that sector. This is also true for a rewritable optical recording disk.

As described above, when the sector to which the data is to be recorded is a defective sector or no longer used because of updating, it is necessary to handle it in such a manner that it can be discriminated in the reproduction cycle.

It is an object of the present invention to provide an optical information recording and reproducing apparatus which can easily distinguish a defective or non-use sector of an optical recording disk from a normal sector.

In order to achieve the above object, a signal having a predetermined pattern is recorded in the defective or non-use sector, and when the predetermined pattern signal is detected in the reproduction cycle, that sector is determined as the defective or non-use sector and no data is reproduced therefrom.

The present invention will be apparent from the following detailed description taken in conjunction with the accompanying drawings, in which.

FIG. 11(a) through (c) is a time chart of the delete detection circuit in a recorded sector in the second embodiment;

FIG. 12(a) through (c) is a time chart of the delete detection circuit in a non-recorded sector in the second embodiment; and FIG. 13(a) and 13(b) shows a delete pulse and a delete detection signal applied to a serial port of a CPU in the second embodiment.

Embodiments of the present invention will now be explained in detail.

In accordance with the present invention, when a defective or non-use sector is detected, a specific signal is written into an information recording area in that sector in order to facilitate the identification of the defective or non-use sector.

Hereinafter, writing of the specific signal is referred to as deleting and the specific signal is referred to as a delete signal.

In a first embodiment, in order to identify a defective sector from which a recorded data will not be correctly reproduced or a sector which will no longer be used after recording of a data, a strong power light is irradiated to an information recording area of that sector to overwrite thereon and an envelope of a reproduced signal is checked.

In a second embodiment, in order to identify an unrecorded defective sector including a dropout, a defective sector from which a recorded data will not be correctively reproduced or a sector which will no longer be used after recording of a data, a plurality of pulse trains are recorded in the information recording area of that sector and a reproduced signal is checked.

The first and second embodiments will now be explained in detail.

Figure 3:
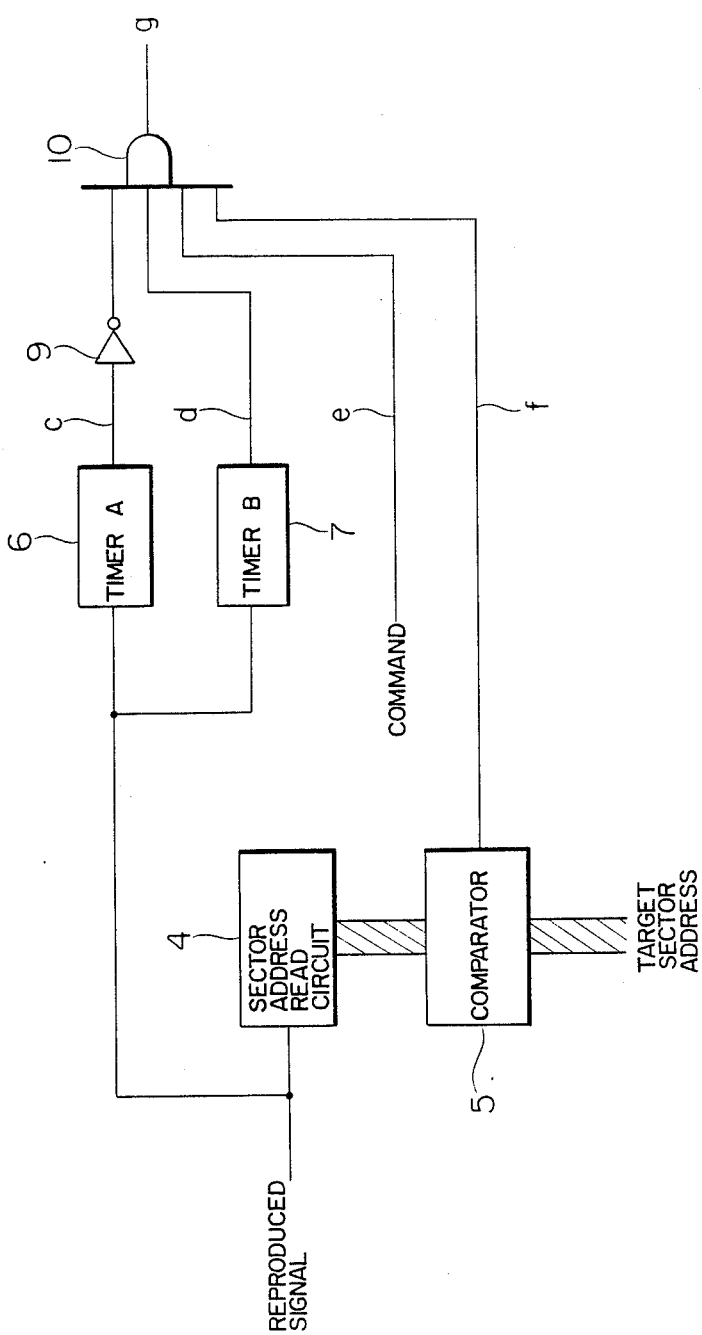
FIG. 3 is a block diagram of a unit for overwriting a DC signal on a portion of a recording signal in accordance with a first embodiment of the present invention.
Figure 4:
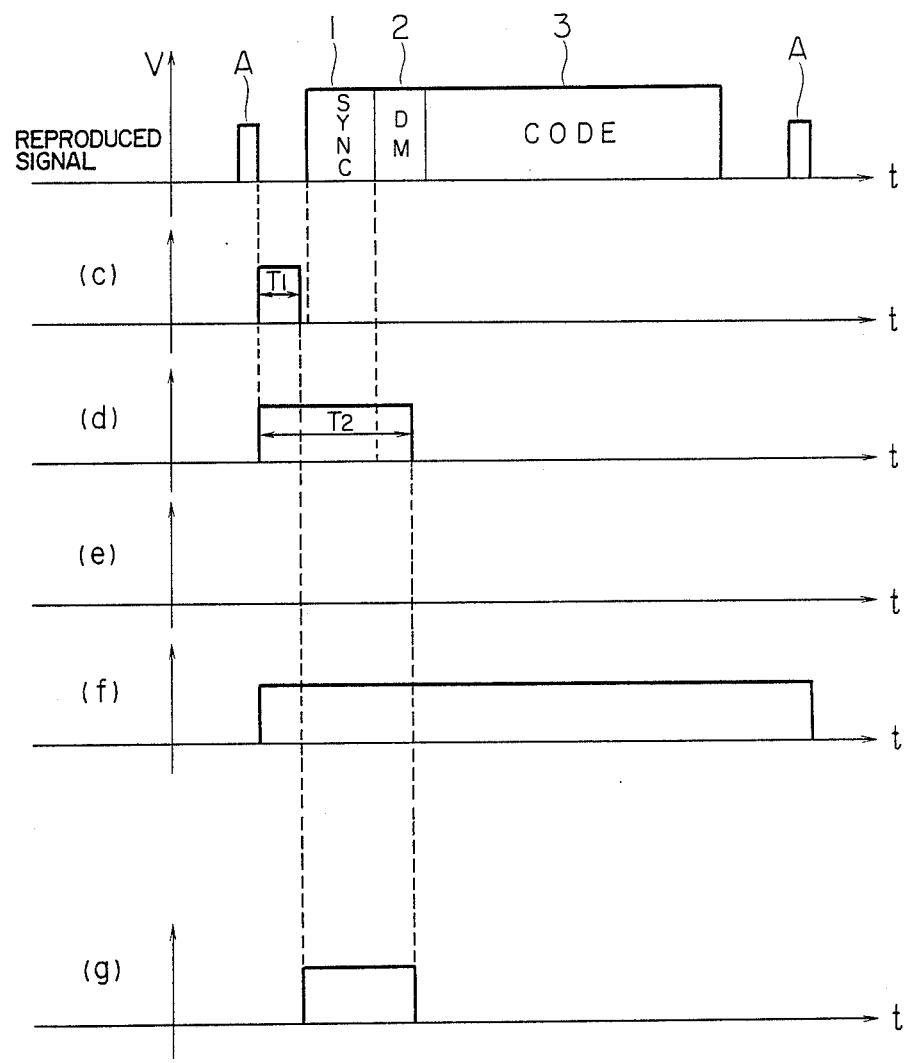
FIG. 4 is a timing chart of signals in the circuit of FIG. 3.

FIG. 3 is a block diagram of a unit for overwriting in accordance with the first embodiment of the present invention, and FIG. 4 is a timing chart of signals in the circuit of FIG. 3.

Referring to FIG. 3, numeral 4 denotes a circuit for reproducing a sector address from an address field contained in a reproduced signal, numeral 5 denotes a comparator which compares a target sector address with recorded data sector address and produces a high level signal f only during a match period, numeral 6 denotes a timer A which produces a high level signal during a period $T_1$ starting from the end of the address field A, numeral 7 denotes a timer B which produces a high level signal for a period $T_2$ starting from the end of the address field A, numeral 9 denotes an inverter and numeral 10 denotes a 4-input AND gate. The timer A 6 and the timer B 7 are triggered by a signal produced by a circuit (not shown) which detects the address field A from the reproduced signal. The AND gate 10 ANDs the output of the inverter 9, the output of the timer B7, the output of the comparator 5 and a delete command signal e to produce a signal g. A strong power light is irradiated when the signal g is high level so that partial overwriting is effected to the data in the defective sector.

Means for discriminating the sector having the signal partially overwritten because of the defective sector from a normal sector or an unrecorded sector is described below.

Figure 5:
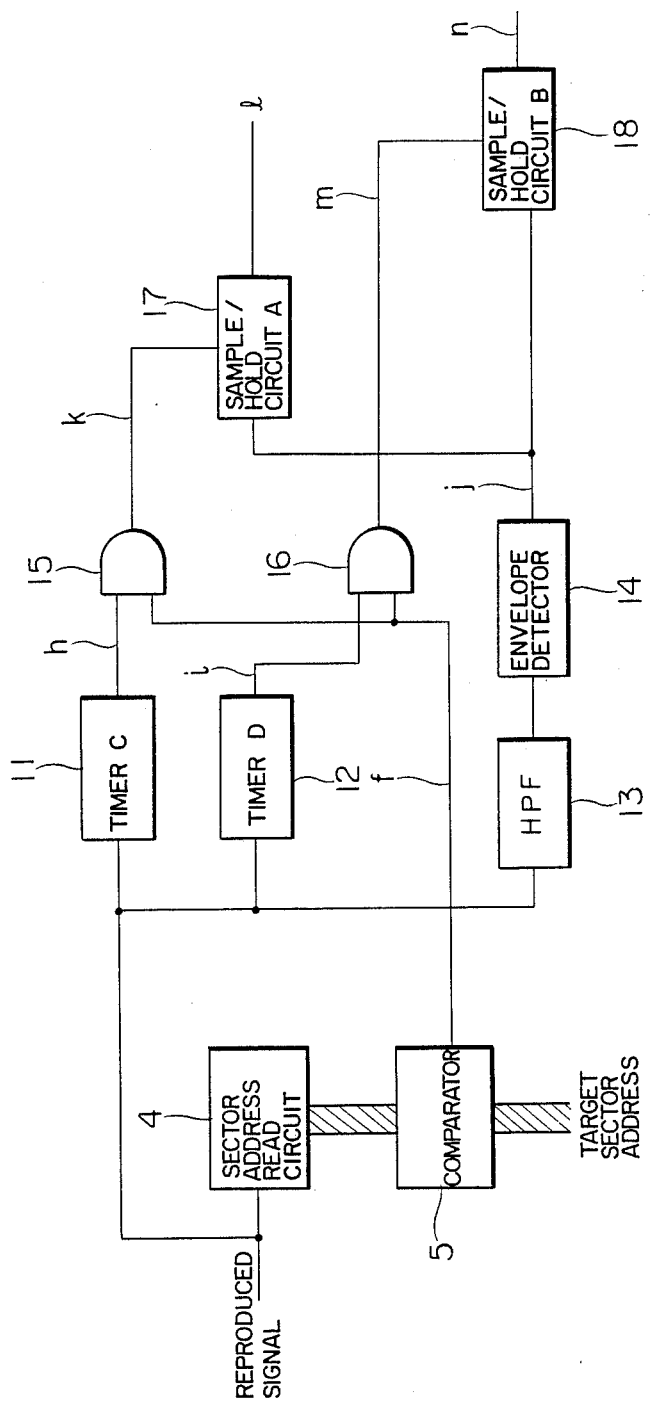
FIG. 5 is a block diagram of a unit for discriminating a recording status in the first embodiment.
Figure 6:
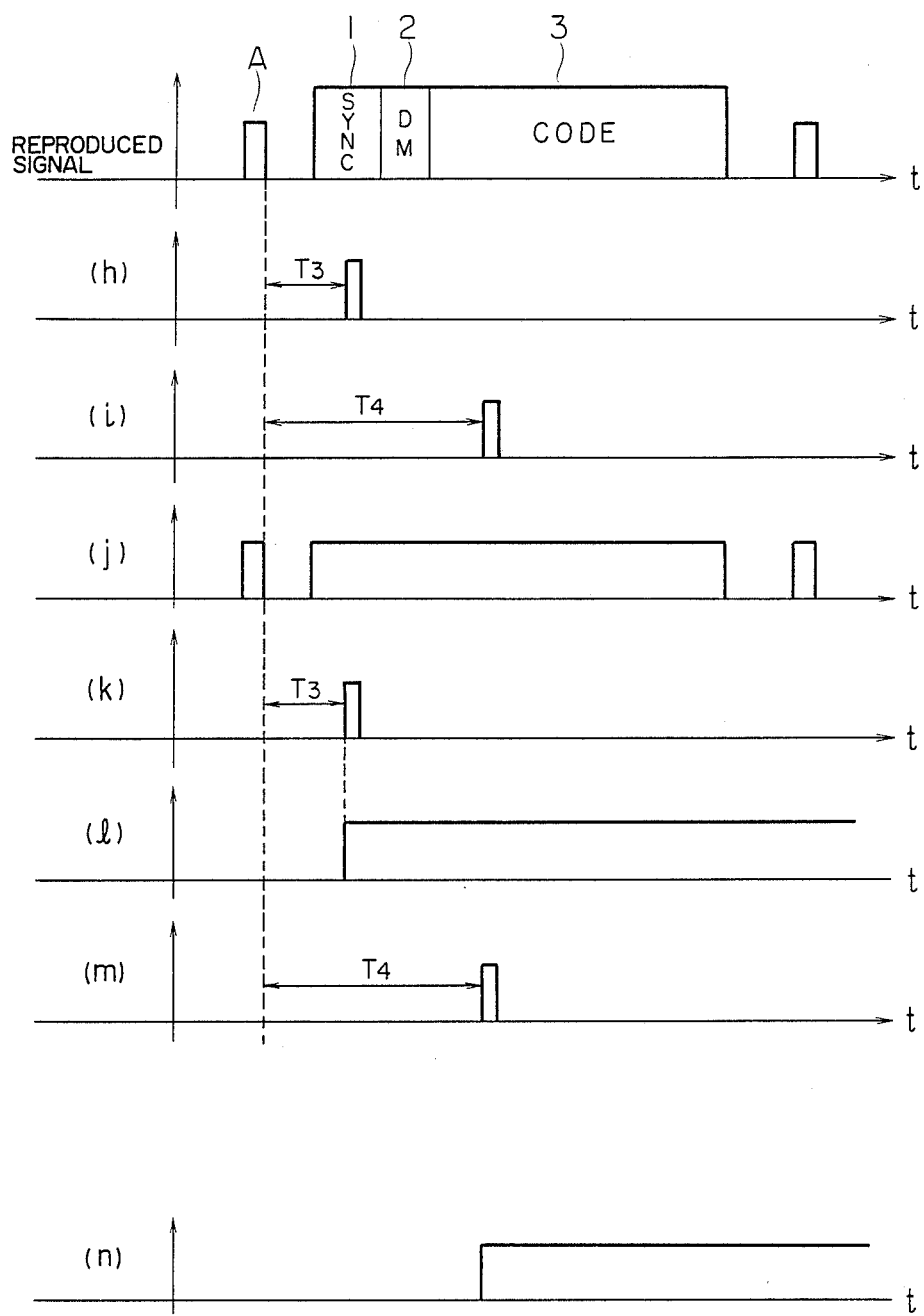
FIG. 6 is a timing chart of signals in the circuit of FIG. 5.

FIG. 5 is a block diagram of a unit for discriminating a record status of the sector in the first embodiment, and FIG. 6 is a timing chart for the signals in the circuit of FIG. 5. The like elements to those shown in FIGS. 3 and 4 are designated by the like numerals. Numeral 11 denotes a timer c which generates a sample pulse at a period $T_3$ after the end of the address field A of the reproduced signal, numeral 12 denotes a timer D for generating a sample pulse a period $T_4$ after the end of the address field A of the reproduced signal, numeral 13 denotes a high pass filter which suppresses a low frequency component of the reproduced signal, numeral 14 denotes a circuit for detecting an envelope of the output from the high pass filter 13, numerals 15 and 16 denote 2-input AND gates which gate the output pulses h and i of the timers C and D, respectively, only when the output f of the comparator 5 is high level to supply sample pulses k and m to sample/hold circuits A 17 and B 18, respectively.

If the time periods $T_1$, $T_2$, $T_3$ and $T_4$ meet a relation of $$T_1 < T_3 < T_2$$

$$T_2 < T_4$$

(the signal i is produced no later than the area of the coded data 3). and a signal at a target sector is reproduced, the recording status of the target sector can be determined in the following manner.

(a) If both outputs l and n are low level, it is an unrecorded sector.

(b) If the output l is low level and the output n is high level, it is a sector having a portion of signal deleted due to a defective area.

(c) If both outputs l and n are high level, it is a normally recorded sector.

In the present embodiment, the signal is overwritten on the front half of the recorded information area, and the envelope of the reproduced signal for the overwritten area is detected, although the overwritten area is not restricted to the front half. Namely, the signal may be overwritten on any portion so long as a portion of the recorded information remains and can be detected.

Figure 7:
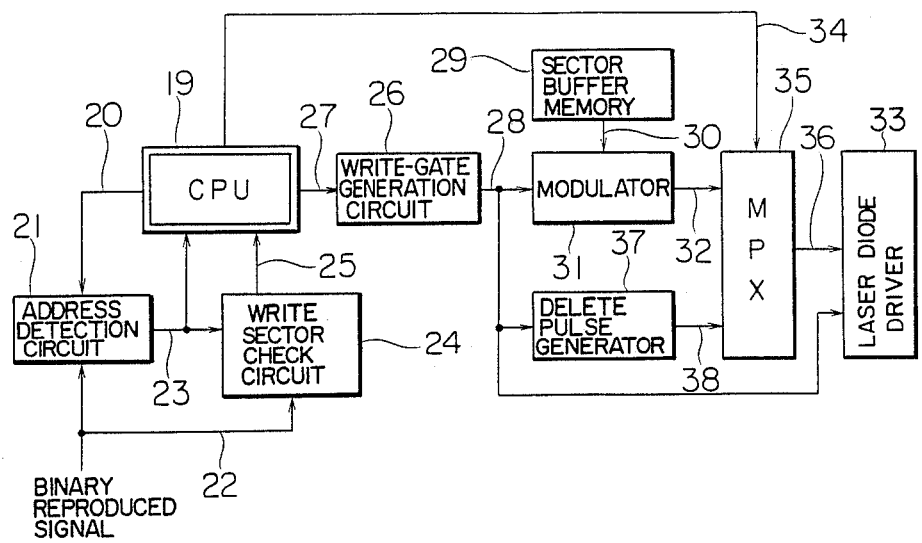
FIG. 7 is a block diagram of a sector data record and delete circuit in accordance with a second embodiment of the present invention.

FIG. 7 is a block diagram of a circuit in accordance with the second embodiment of the present invention.

Figure 1:
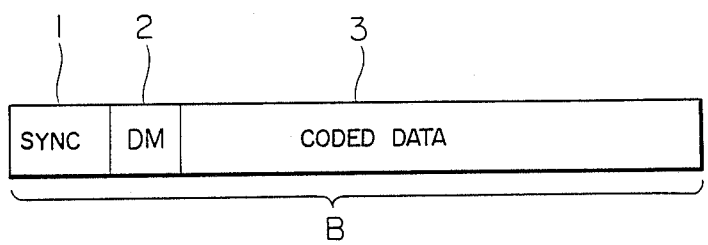
FIG. 1 shows a sector format of a recording signal.
Figure 2:
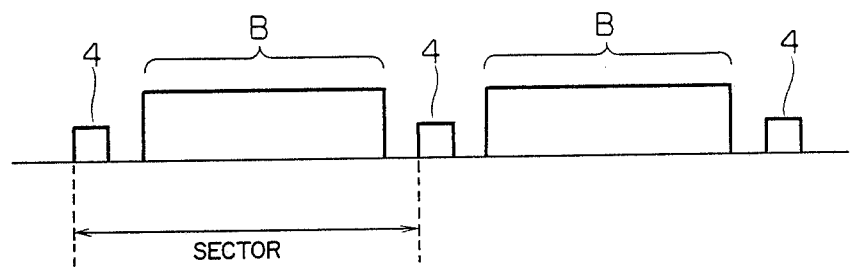
FIG. 2 shows sector addresses and recording signal blocks of an optical recording disk.

When a data is to be written, a target sector address 20 to which the data is to be written is sent from a CPU 19 to an address detection circuit 21. When it detects the target address from a binary reproduced signal 22, it sends an address detection signal 22 to a write sector check circuit 24 which checks if the target sector is a recorded sector or an unrecorded sector, a deleted sector or not, or if the sector has the presence or absence of dropout, and sends a check signal 25 back to a CPU 19. If the target sector is an unrecorded sector which includes no dropout, the CPU 19 sends a write command signal 27 to a write gate generation circuit 26 in response to the address detection signal 23 so that the write gate generation circuit 26 generates a write gate signal 28. A data 30 from a sector buffer memory 29 is modulated by a modulator 31 in accordance with the write gate signal 28 and a synchronizing signal and a data mark as shown in FIG. 1 are added thereto to form a sector record signal 32, which is then supplied to a laser diode driver 33. An output 36 of a multiplexer 35 is controlled by a switching signal 34 from the CPU 19 so that the record signal from the modulator 31 is selected.

A delete sequence is now explained. In a non-rewritable disk, if a recorded data cannot be read because a sequence of bits for word-synchronizing the data is erroneously read or if an uncorrectable error is included in the data read and hence the same data is to be written into another sector, or if a portion of the data is to be updated, or in a non-rewritable or rewritable disk, if a dropout which will apparently cause an error if a data is recorded is present, the delete pulse is written into the defective or non-use sector.

After checking of the target sector, the delete pulse 38 generated by a delete pulse generator 37 is applied to the multiplexer 35 which selects the delete pulse 38 as an output 36 thereof by a switching signal 34 from the CPU 19 and the output 36 is written onto an optical recording disk.

Figure 8:
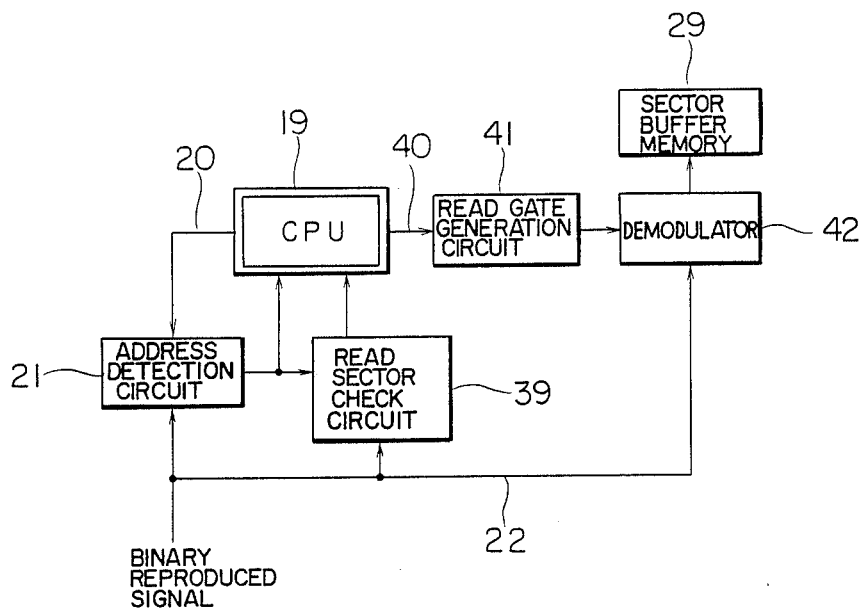
FIG. 8 is a block diagram of sector data reproduction in the second embodiment.

FIG. 8 shows a block diagram of a circuit for reading the data. The target address 20 is sent from the CPU 19 to the address detection circuit 21 and a read sector check circuit 39 checks if the target sector is a recorded sector or a deleted sector. If it is a normal sector, the CPU 19 sends a read command signal 40 to a read sector gate generation circuit 41 and a demodulator 42 demodulates a data from the binary reproduced signal and it is stored in the sector buffer memory 29.

Figure 9:
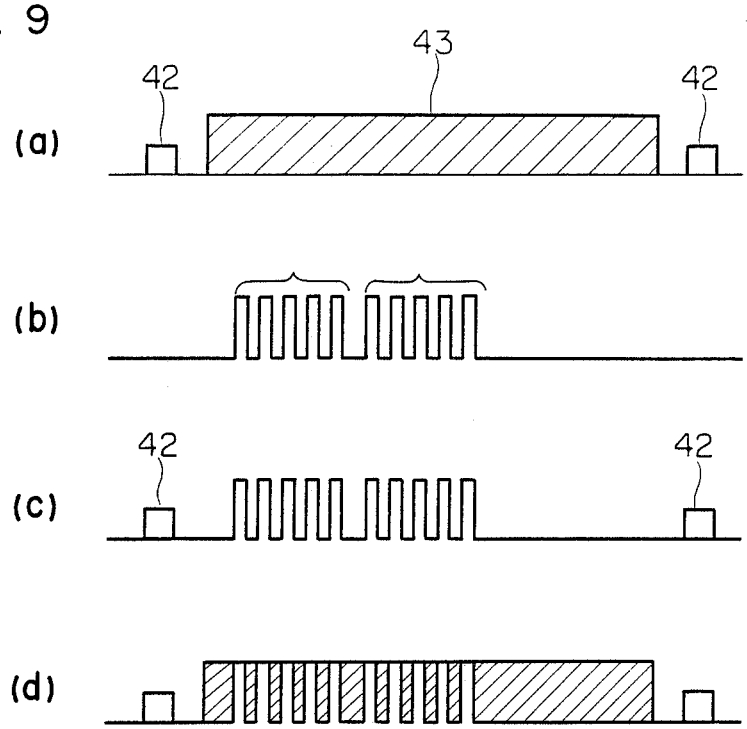
FIG. 9a through 9d is a status chart of a delete pulse and a reproduced signal in a delete mode in the second embodiment.

FIG. 9 shows status of the reproduced signal in the delete mode. FIG. 9(a) shows the reproduced signal when the data is recorded in the sector, in which numeral 42 denotes an address and numeral 43 denotes an envelope field of the data. FIG. 9(b) shows a write pulse sequence in which a pair of pulse trains having a lower frequency than the recording frequency of the data are provided in a spaced relation so that they are distinguished from the data. FIG. 9(c) shows a reproduced signal when the signal shown in FIG. 9(b) is written into an unrecorded sector. FIG. 9(d) shows a reproduced signal when the signal shown in FIG. 9(b) is overwritten on a recorded sector. The laser is energized to a recording power state by the "H" level of the signal shown in FIG. 9(b) so that the original high frequency data in those areas are changed to an "H" level.

Figure 10:
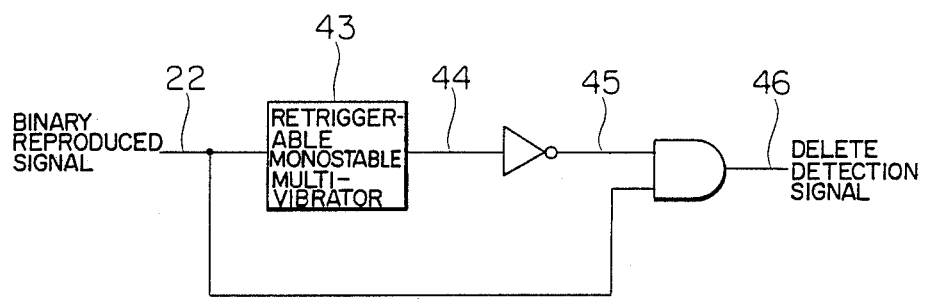
FIG. 10 shows a delete detection circuit in the second embodiment.

FIG. 10 shows a circuit for detecting a delete sector. The binary reproduced signal 22 is supplied to a retriggerable monostable multivibrator 43 having a longer time constant than a maximum pulse interval of the data, and an inverted signal 45 of an output 44 of the monostable multivibrator 43 and the binary reproduced signal 22 are ANDed to produce a delete detection signal 46.

Figure 11:
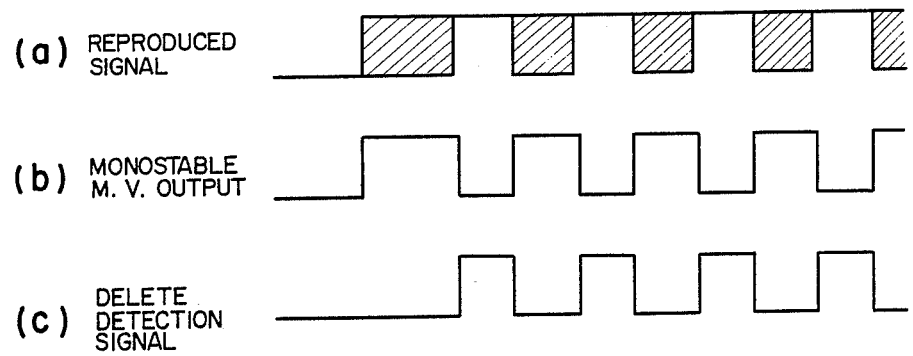
Figure 12:
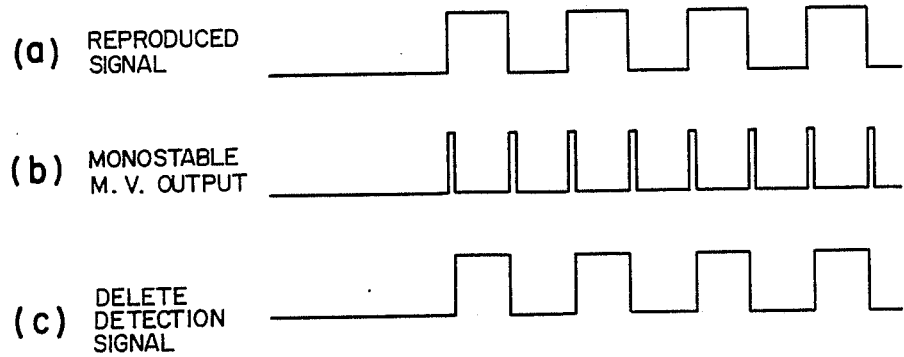

FIGS. 11 and 12 show time charts for the delete sector detection circuit. FIG. 11 is for a recorded sector and FIG. 12 is for an unrecorded sector.

FIG. 11(a) shows the binary reproduced signal when the delete pulse is overwritten, and a hatched area shows a data field. FIG. 11(b) shows an output when the signal shown in FIG. 11(a) is supplied to the retriggerable monostable multivibrator 43 of FIG. 10. FIG. 11(c) shows the delete detection signal which is produced, by ANDing the binary reproduced signal of FIG. 11(a) and an inversion of the monostable multivibrator output of FIG. 11(b). Since the time constant of the retriggerable monostable multivibrator is slightly longer than the recording pulse width of the data and the pulse interval of the delete pulse is longer than that, the delete detection signal produced has substantially the same waveform as that of the original delete pulse although it is shifted by the duration corresponding to the time constant of the monostable multivibrator.

FIG. 12 shows the time chart when an unrecorded sector is deleted. FIG. 12(a) shows the binary reproduced signal which has the same waveform as the recording delete pulse. FIG. 12(c) shows a delete detection signal which is produced by ANDing the binary reproduced signal of FIG. 12(a) and an inversion of a monostable multivibrator output shown in FIG. 12(b). The delete detection signal for the recorded sector and that for the unrecorded sector are identical.

A method for detecting the delete sector by using a serial port of the CPU is now explained.

Examples of the delete pulse to be recorded and the delete pulse detection signal are shown in FIG. 13. FIG. 13(a) shows the delete pulse to be recorded which includes two sets of five pulses each having a duration $t_1$ and an interval $t_1$. FIG. 13(b) shows an inversion of the delete detection signal produced when the signal of FIG. 13(a) is reproduced. The pulse duration changes by the duration corresponding to the time constant of the retriggerable monostable multivibrator used for the detection, that is, $t_2 + t_3 = 2t_1$ $(t_2 > t_1)$ The serial port of the CPU which is a stepping synchronization type serial data receiver detects a start bit at a rise time from a high level to a low level and reads in a multi-bit data at a predetermined baud rate in response to the start bit. If the delete pulse to be recorded has a pattern which matches the baud rate of the CPU and the delete detection signal detected in the reproduction mode is directly sent to the CPU, the CPU can immediately detect the delete sector. In the present embodiment, the eight bits following the start bit, that is, "10101010" are read in. The nineth bit is a stop bit. In the present embodiment, the same pattern is recorded again with a separation of several bits. By recording two sets of delete pulses and detecting the delete sector if one of the sets is detected, reliability is improved. The reliability may be further improved by recording three sets of delete pulses and detecting the delete sector if at least two of the sets are detected.

Since the CPU samples the data at a higher frequency than the baud rate, the interval of the delete pulse may be as long as possible, but since the low frequency is cut if an AC amplifier is used in the reproducing channel, the interval of the delete pulse is determined by a compromise of the two.

For example, when the CPU 8051 is clocked at 12 MHz and the baud rate is 187.5 Kbps, the frequency of the delete pulse is 187.5 KHz which can be beyond the cut low-frequency range.

In the first embodiment, since the special write signal is a DC signal, if it is overwritten on the recorded defective sector, the deleting can be readily detected because the envelope of the reproduced signal is lowered. However, if the DC signal is written on the unrecorded defective sector, the deleting can not be detected because the envelope does not change.

On the other hand, in the second embodiment, the same special signal may be written on the recorded sector or the unrecorded sector and the delete sector can be detected. Accordingly, the second embodiment is superior to the first embodiment.

In accordance with the present invention, the defective or non-use sector in the non-rewritable optical disk can be readily detected.

We claim:

1. An optical information recording and reproducing apparatus, comprising:
   means for rotating an optical recording disk having tracks divided into a plurality of sectors each comprising an address field area and an information recording area;
   means for irradiating the disk with a laser beam;
   address reading means for reading out address information from the address field area of a sector of said disk;
   information recording means for modulating the laser beam to record an information signal having a predetermined maximum transition interval on an information recording area of said sector comprising the address information read out by said address reading means;
   information reproduction means for reproducing the information signal from said sector comprising the address information read out by said address reading means;
   pulse-train generation means for generating at least one pulse train comprising a plurality of pulses longer than said predetermined maximum transition period of said information signal;
   pulse-train recording means, responsive to said pulse train generated by said generation means, for modulating an intensity of said laser beam to record a pulse-train signal comprising plural trains on said information recording area of said sector;

pulse-train reproducing means for reproducing said pulse-train signal recorded on said information recording area;

pulse-train detection means for detecting a coincidence between the pulse train signal reproduced by said pulse-train reproducing means and the pulse train generated by the generation means;

said pulse-train recording means comprising means for recording the pulse-train signal on the information recording area of said sector when the information reproduction means detects the error data when the information signal is reproduced by the information reproduction means;

said pulse-train detection means comprising means for (i) checking each of said sectors in information playback mode in order to detect said coincidence and (ii) responsive to a detection of said coincidence, preventing recording and reproducing of information on said sector; and wherein the pulse-train generation means comprises a monostable multivibrator capable of being retriggered and having a time constant longer than said predetermined maximum transition interval of the information signal to be recorded, and said pulse-train reproducing means comprises means for reproducing a binary signal from the pulse train signal recorded on one of said sectors, said monostable multivibrator receiving said binary signal and producing an output signal having a same polarity as a polarity of the binary signal reproduced by said pulse-train reproducing means; and a logic summing means for summing the binary signal and an inverted signal of an output signal of the multivibrator.

2. An optical information recording and reproducing apparatus, comprising:

means for rotating an optical recording disk having tracks divided into a plurality of sectors each comprising an address field area and an information recording area;

means for irradiating the disk with a laser beam;

address reading means for reading out address information from the address field area of a sector of said disk;

information recording means for modulating the laser beam to record an information signal having a predetermined maximum transition interval on an information recording area of the sector comprising the address information read out by said address reading means;

information reproduction means for reproducing the information signal from said sector comprising the address information read out by said address reading means;

pulse-train generation means for generating a pulse train (i) comprising a plurality of pulses longer than said predetermined maximum transition period of said information signal and (ii) defining plural data comprising a start bit for indicating a start of the plural data by means of a polarity inversion, a plurality of data bits, and a stop bit for indicating an end of the plural data by means of a polarity inversion opposite to said polarity inversion of said start bit;

pulse-train recording means, responsive to said pulse-train generated by said generation means, for modulating an intensity of said laser beam to record a pulse-train signal on said information recording area of said sector;

pulse-train reproducing means for deriving from the information recording area of said sector said pulse-train recorded by the pulse-train recording means;

pulse-train detection means for (i) detecting pulses of the pulse train derived by said pulse-train reproducing means to detect said start bit which comprises a first pulse having an inverted polarity in the information recording area of said sector, (ii) reading out plural data up to said stop bit in accordance with a given period of clock pulses and (iii) detecting whether the plural data read out coincide with the plural data generated by the pulse-train generation means;

said pulse-train recording means comprising means for recording the pulse-train signal on the information recording area of said sector when the information reproduction means detects the error data when the information signal is being reproduced by the information reproduction means; and said pulse-train detection means comprising means for (i) checking each of said sectors in information playback mode in order to detect said coincidence and (ii) responsive to a detection of said coincidence, preventing recording and reproducing of information on said sector; and the pulse-train generation means comprising a monostable multivibrator capable of bein retriggered and having a time constant longer than said predetermined maximum transition interval of the information signal to be recorded, and said pulse-train reproducing means comprising means for reproducing a binary signal from the pulse train signal recorded on one of said sectors, said monostable multivibrator receiving said binary signal and producing an output signal having a same polarity as a polarity of the binary signal reproduced by said pulse-train reproducing means; and a logic summing means for summing the binary signal and an inverted signal of an output signal of the multi-vibrator.

* * * * *